No. 627,511. Patented June 27, 1899.
A. LEHMANN, Sr.
CUSHION TIRE FOR VEHICLES.
(Application filed Dec. 9, 1898.)
(No Model.)
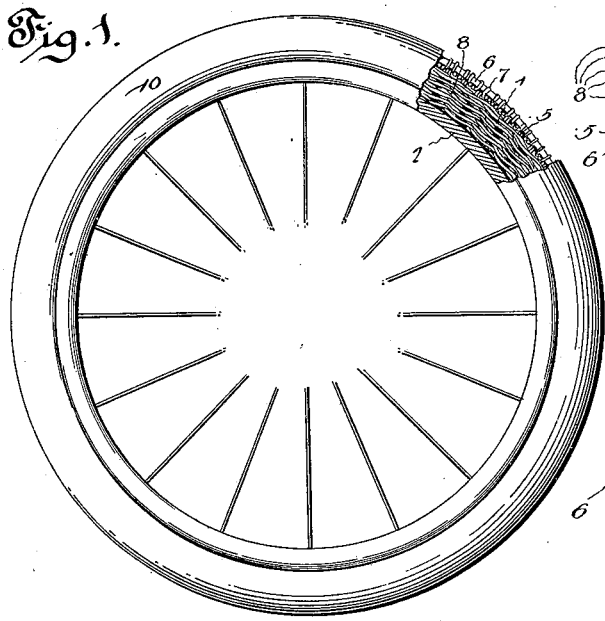
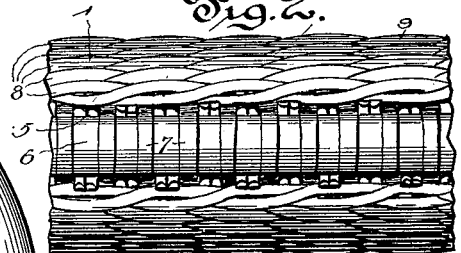
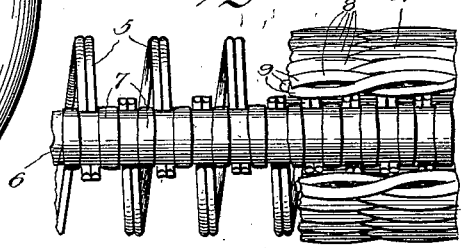
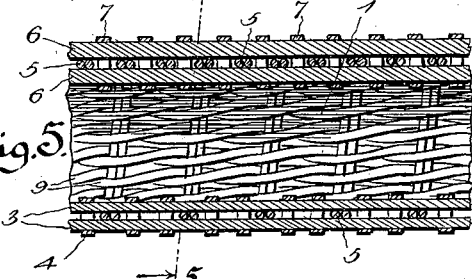
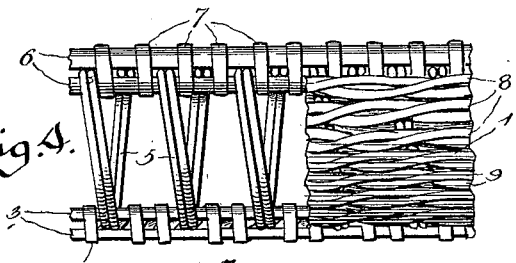
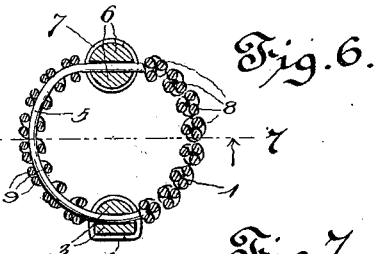
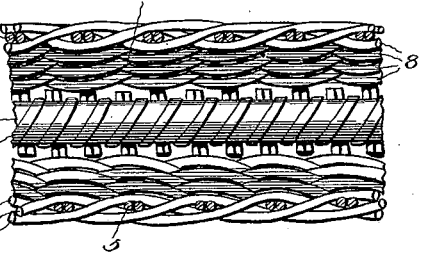
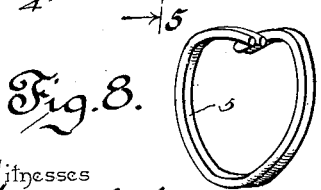
Witnesses
August Lehmann, Sr., Inventor.
By his Attorneys,

UNITED STATES PATENT OFFICE.

AUGUST LEHMANN, SR., OF CHICAGO, ILLINOIS, ASSIGNOR OF ONE-HALF TO FRED. BOSE, OF SAME PLACE.

CUSHION-TIRE FOR VEHICLES.

SPECIFICATION forming part of Letters Patent No. 627,511, dated June 27, 1899.

Application filed December 9, 1898. Serial No. 698,755. (No model.)

*To all whom it may concern:*

Be it known that I, AUGUST LEHMANN, Sr., a citizen of the United States, residing at Chicago, in the county of Cook and State of Illinois, have invented a new and useful Cushion-Tire for Vehicles, of which the following is a specification.

This invention relates to tires for bicycles or other light vehicles; and it has for its object to provide a tire for this purpose having the requisite degree of elasticity to cushion the shock incident to the travel of the vehicle, while at the same time having exceptional strength and lightness.

To this end the invention primarily contemplates a cushion-tire designed for use within a suitable covering and so constructed as to possess every advantage of the ordinary pneumatic tires, while at the same time possessing the additional advantage over such tires of being non-collapsible when punctured. In other words, it is the object of the invention to produce a non-inflatable cushion-tire which shall obviate all the objections to a pneumatic tire, while fully carrying out or attaining every function thereof.

With these and other objects in view, which will readily appear as the nature of the invention is better understood, the same consists in the novel construction, combination, and arrangement of parts hereinafter more fully described, illustrated, and claimed.

While the essential and characteristic features of the invention are necessarily susceptible to modification, still the preferred embodiment of the invention is illustrated in the accompanying drawings, in which—

Figure 1 is a side view of a cushion-tire constructed in accordance with the present invention, showing the same fitted to the rim of a bicycle-wheel and also showing a portion of its exterior covering removed. Fig. 2 is an enlarged detail plan view of a portion of the tire with the covering removed. Fig. 3 is a similar view exposing a number of the weft-ribs. Fig. 4 is a side view of the construction shown in Fig. 3. Fig. 5 is a detail longitudinal sectional view of a portion of the tire. Fig. 6 is a cross-sectional view on the line 5 5 of Fig. 5. Fig. 7 is a detail sectional view on the line 7 7 of Fig. 6. Fig. 8 is a detail in perspective of one of the duplex weft-ribs. Fig. 9 is a detail view of a portion of one of the twisted body or warp strands.

Referring to the accompanying drawings, the numeral 1 designates the complete tire exclusive of its exterior covering, and this tire is in the usual form of a continuous hollow body or tube, which in the present invention is made entirely of woven reeds, thereby producing a tubular woven-reed fabric as the body structure of the tire, such reed fabric being exceedingly light and durable, while at the same time possessing sufficient elasticity to give an ample cushion effect similar to the cushion effect of ordinary rubber cushion or pneumatic tires.

In constructing the tubular reed tire 1 there is employed at the side of the tire next to the rim 2, in which it fits, a pair of circular superposed reed base-bands 3, which are of slightly-different diameters, so as to register one within the other in concentric relation, and these reed base-bands 3 are firmly bound together by means of a continuous wrapping of a cane or equivalent tying-strip 4, said cane tying-strip 4 encircling both of the base-bands 3 and being wrapped spirally about the same throughout their entire circumference. The reed base-bands 3, which are bound together by the tying-strip 4, practically form a clamp for binding therebetween the circumferential series of spaced weft-ribs 5, each of which ribs is preferably formed of a pair of reeds arranged side by side, and may therefore be properly termed a "duplex" weft-rib. The said duplex weft-ribs 5 are spaced at regular distances apart and are arranged transversely of the base-bands 3, between which they are clamped, said weft-ribs being bent from opposite sides of the base-bands into a substantially circular shape to produce the cross-sectional circular shape of the complete tire. The opposite portions of the weft-ribs 5 are disalined, whereby the terminals of said ribs will be arranged at one side of each other and in different planes between the pair of circular tread-bands 6. The circular tread-bands 6 are also formed of continuous strips of reed and, like the base-bands 4, are of slightly different diameters, whereby the same will register one within the other in concentric relation; but both of the tread-bands are of a materially larger diameter than the base-bands, so as to be spaced a material distance therefrom to permit of the body of the tire having a free elastic action. The pair of reed tread-bands 6 are also firmly bound together by means of a continuous wrapping of a cane or equivalent tying-strip 7, which encircles both of the bands 6 and is wrapped spirally about the same throughout their entire circumference.

The spaced concentric bands 3 and 6 rigidly hold in position the circumferential series of weft-ribs 5, which together form a skeleton weft or rib framework for the twisted body or warp strands 8, which are interwoven with the weft-ribs at both sides of the concentric bands 3 and 6. The body or warp strands 8 are closely arranged side by side to produce a close-woven fabric and entirely cover up the skeleton structure of the tire, and each of said strands 8 consists of a plurality of single stems 9, plaited together and interlaced or woven around the weft-ribs 5, whereby the strands and weft-ribs are firmly interlocked into a compact-woven body or fabric which constitutes the main portion of the elastic body of the tire.

The twisted body or warp strands 8 extend continuously and circumferentially around the entire body of the tire, and at this point it is to be observed that by reason of the disalinement of the opposite portions of the weft-ribs 5 the body or warp strands, respectively, at opposite sides of the bands 3 and 6 alternately engage with the ribs and thereby brace the entire structure, and it is also important in the manufacture of the tire that the reed fabric at one side of the center of the tire be woven in an opposite direction to that at the opposite side of the center of the tire, thus insuring the tire retaining its shape under all conditions.

The complete tire when in use is provided with an exterior covering 10, of rubber, leather, canvas, or any other material suitable for the purpose; but it will of course be understood that any suitable form of protective covering may be employed in connection with the tire and may be secured thereon in any suitable manner without affecting the spirit or scope of the invention.

Changes in the form, proportion, and the minor details of construction may be resorted to without departing from the principle or sacrificing any of the advantages of this invention.

Having thus described the invention, what is claimed as new, and desired to be secured by Letters Patent, is—

1. A vehicle-tire, consisting of a tubular body having a circumferential series of approximately circular weft-ribs, and circumferential warp-strands interwoven therewith and a base and tread band each comprising concentric elements lying on opposite sides of the adjacent ribs, the elements of each band having mutual connections, substantially as set forth.

2. A vehicle-tire consisting of a tubular body made of reeds and comprising a central tread-band, and woven reed fabric at each side of said tread-band, substantially as set forth.

3. A vehicle-tire consisting of a tubular body made of reeds and comprising a central tread-band, and woven reed fabric at each side of said tread-band, the fabric at opposite sides of the tread-band being respectively woven in opposite directions, substantially as set forth.

4. A vehicle-tire consisting of concentric pairs of spaced reed base and tread bands respectively, cane tying-strips encircling and binding together, separately, the pair of base-bands and the pair of tread-bands, approximately circular weft-ribs disposed transversely of the two pairs of bands and clamped therebetween, and continuous body or warp strands interwoven with the weft-ribs at each side of the plane of the base and tread bands, substantially as set forth.

In testimony that I claim the foregoing as my own I have hereto affixed my signature in the presence of two witnesses.

AUGUST LEHMANN, Sr.

Witnesses:
ALBERT HAHN,
AUGUST LEHMANN, Jr.